US012798885B2

(12) United States Patent
Zhao et al.

(10) Patent No.: US 12,798,885 B2
(45) Date of Patent: Nov. 17, 2026

(54) POSITIONING APPARATUS AND SYSTEM

(71) Applicant: CONTEMPORARY AMPEREX TECHNOLOGY (HONG KONG) LIMITED, Hong Kong (CN)

(72) Inventors: Meng Zhao, Ningde (CN); HuiHui He, Ningde (CN); Hongqi Ming, Ningde (CN); Fanke Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 281 days.

(21) Appl. No.: 18/662,764

(22) Filed: May 13, 2024

(65) Prior Publication Data

US 2024/0300746 A1 Sep. 12, 2024

Related U.S. Application Data

(63) Continuation of application No. PCT/CN2022/128436, filed on Oct. 28, 2022.

(30) Foreign Application Priority Data

Nov. 15, 2021 (CN) ......................... 202122790363.8

(51) Int. Cl.
*B65G 35/06* (2006.01)
*B65G 43/00* (2006.01)
*H01M 10/04* (2006.01)

(52) U.S. Cl.
CPC ............. *B65G 35/06* (2013.01); *B65G 43/00* (2013.01); *H01M 10/0404* (2013.01); *B65G 2811/09* (2013.01)

(58) Field of Classification Search
CPC .... B65G 35/06; B65G 43/00; H01M 10/0404
(Continued)

(56) References Cited

U.S. PATENT DOCUMENTS

2011/0196531 A1 8/2011 Herrmann
2022/0397231 A1* 12/2022 Tsutsui .................... G12B 5/00
(Continued)

FOREIGN PATENT DOCUMENTS

CN 202988330 U 6/2013
CN 103482404 B 2/2016
(Continued)

OTHER PUBLICATIONS

The World Intellectual Property Organization (WIPO) International Search Report for PCT/CN2022/128436 Dec. 14, 2022 8 Pages (including translation).
(Continued)

*Primary Examiner* — Ahshik Kim
(74) *Attorney, Agent, or Firm* — ANOVA LAW GROUP, PLLC

(57) ABSTRACT

A positioning apparatus includes: a rotating member arranged on a base, a bearing member arranged on the base through the rotating member, a first driving mechanism used for applying a force to the bearing member from a first side of the bearing member, and a second driving mechanism used for applying a force to the bearing member from a second side of the bearing member. When the bearing member is subjected to force, a force is applied to the rotating member, and the rotating member rotates in situ to drive the bearing member to move. The bearing member is configured to, when moving to a first preset position, bear an energy storage cabinet in the production process of an energy storage production line of batteries.

10 Claims, 6 Drawing Sheets

(58) Field of Classification Search
USPC .......................................................... 414/785
See application file for complete search history.

(56) References Cited

U.S. PATENT DOCUMENTS

| | | | | |
|---|---|---|---|---|
| 2023/0170517 | A1* | 6/2023 | Wang | H01M 50/264 |
| 2024/0326179 | A1* | 10/2024 | Wang | B23K 26/24 |
| 2026/0054964 | A1* | 2/2026 | Ho | B66C 1/42 |
| 2026/0058184 | A1* | 2/2026 | Ho | H01M 10/0404 |

FOREIGN PATENT DOCUMENTS

| | | | |
|---|---|---|---|
| CN | 205169773 | U | 4/2016 |
| CN | 105033880 | B | 12/2017 |
| CN | 209993584 | U | 1/2020 |
| CN | 212977962 | U | 4/2021 |
| CN | 214125048 | U | 9/2021 |
| CN | 216071927 | U | 3/2022 |
| JP | S6087148 | A | 5/1985 |

OTHER PUBLICATIONS

The European Patent Office (EPO) The Extended European Search Report for Application No. 22891820.7. Jan. 29, 2025 7 Pages.

* cited by examiner

POSITIONING APPARATUS AND SYSTEM

CROSS-REFERENCE TO RELATED APPLICATIONS

The present application is a continuation of International Application No. PCT/CN2022/128436, filed on Oct. 28, 2022, which claims priority to Chinese Patent Application No. 202122790363.8 entitled "POSITIONING APPARATUS AND SYSTEM" and filed on Nov. 15, 2021, the entire contents of both of which are incorporated herein by reference.

TECHNICAL FIELD

The present application relates to the field of battery production devices, specifically relates to a positioning apparatus and system.

BACKGROUND

At present, in the production process of an energy storage cabinet production line of batteries, it basically relies on manual operation. For example, an energy storage cabinet is manually placed on a forklift, and transported to the corresponding position through the forklift for other production processes.

Therefore, there are still problems such as low degree of automation and high manual manpower in the production of energy storage cabinets, which will lead to low production efficiency.

SUMMARY

Technical Problems

The present application provides a positioning apparatus and system. The positioning apparatus may solve the problems in the related art that an energy storage cabinet is tedious in transportation, heavy in installation, low in control precision, low in working efficiency and the like.

Technical Solution

In a first aspect, the present application provides a positioning apparatus; and the positioning apparatus includes: a rotating member which is arranged on a base. A bearing member is arranged on the base through the rotating member. A first driving mechanism is used for applying a force to the bearing member from a first side of the bearing member. A second driving mechanism is used for applying a force to the bearing member from a second side, adjacent to the first side, of the bearing member. When the bearing member is subjected to force, a force is applied to the rotating member, and then the rotating member rotates in situ to drive the bearing member to move; and when moving to a first preset position, the bearing member is used for bearing an energy storage cabinet in the production process of an energy storage production line of batteries.

In some embodiments, two first driving mechanisms are provided and are respectively arranged on the first side and a third side, opposite to the first side, of the bearing member. The first driving mechanisms are used for applying a force to the bearing member from the first side and the third side respectively.

In these embodiments, the two first driving mechanisms are provided, so that the force can be applied to the bearing member from the first side and the third side, opposite to each other, of the bearing member through the two first driving mechanisms, and the position of the bearing member can be adjusted from the first side and the third side, opposite to each other, of the bearing member.

In some embodiments, each first driving mechanism includes a first driving member, a lead screw and a first pushing member. The driving member and the first pushing member are connected to two ends of the lead screw respectively, the first driving member is fixed to the base, and the first pushing member is located between the bearing member and the first driving member. The lead screw is driven by the first driving member to rotate so as to drive the first pushing member to move in the axis direction of the lead screw; and the first pushing member pushes the bearing member when moving.

In these embodiments, the first driving members drive the lead screws to rotate, the lead screws rotate to drive the first pushing members to move in the axis direction of the lead screws, and the first pushing members push the bearing member when moving, so that the force can be applied to the bearing member through the first pushing members, and the position of the bearing member is adjusted.

In some embodiments, the positioning apparatus further includes a clamping mechanism; the clamping mechanism includes: two supports which are arranged on the first side and the third side respectively, the supports being fixed to the lead screws. Two clamping plates are fixed to the supports respectively, arranged in the direction facing the bearing member and used for clamping the energy storage cabinet borne by the bearing member. The lead screws rotate to drive the supports to move in the axis direction of the lead screws, then the distance between the two supports is increased or decreased, and therefore the two clamping plates clamp the energy storage cabinet.

In these embodiments, a specific structural form of the clamping mechanism is provided, and the energy storage cabinet borne on the bearing member can be clamped through the clamping plate in these embodiments, so that the clamping surface is uniformly stressed.

In some embodiments, the clamping mechanism further includes: at least two third driving mechanisms fixed to the supports; at least two second pushing members which are respectively connected to the third driving mechanisms and arranged in the direction facing the bearing member, where the two third driving mechanisms are used for driving the two second pushing members respectively to reciprocate in the direction of the second side, so that the two second pushing members clamp the energy storage cabinet from two opposite sides of the energy storage cabinet; at least two fourth driving mechanisms which are fixed to the supports and respectively connected to the second pushing members, where the two fourth driving mechanisms are used for driving the two second pushing members respectively to reciprocate in the direction of the first side of the bearing member, the second pushing members apply a force to the energy storage cabinet when moving, and the energy storage cabinet apply a friction force to the bearing member, thus pushing the energy storage cabinet to a second preset position.

In these embodiments, the force can be applied to the energy storage cabinet placed on the bearing member so as to adjust the energy storage cabinet to the second preset position, so that when the energy storage cabinet is not accurately located at the second preset position, the position of the energy storage cabinet can be finely adjusted, and then the energy storage cabinet can be accurately located at the second preset position.

In some embodiments, the second driving mechanism includes a third pushing member and a second driving member. The third pushing member is connected to the second driving member; the second driving member is fixed to the base; the second driving member is used for driving the third pushing member to move; and the third pushing member applies a force to the bearing member when moving.

In these embodiments, the second driving member drives the third pushing member to move, and the third pushing member applies a force to the bearing member when moving, so that the position of the bearing member is adjusted in a mode that the second driving member drives the third pushing member.

In some embodiments, the bearing member is provided with a first position-limiting mechanism, and the base is provided with a second position-limiting mechanism. When the bearing member moves to a third preset position, the bearing member is limited on the base through the cooperation of the first position-limiting mechanism and the second position-limiting mechanism, and therefore relative displacement between the bearing member and the base is avoided.

In these embodiments, a specific fixing mode that the bearing member and the base are detachably fixed together is provided according to this design, thus the connecting strength of the bearing member and the base can be improved, and relative displacement of the bearing member and the base is avoided.

In some embodiments, the positioning apparatus further includes a fifth driving mechanism. The fifth driving mechanism is connected to the second position-limiting mechanism and used for driving the second position-limiting mechanism to move to the first position-limiting mechanism to cooperate with the first position-limiting mechanism when the bearing member moves to the third preset position.

In these embodiments, the fifth driving mechanism drives the second position-limiting mechanism to move to the first position-limiting mechanism to cooperate with the first position-limiting mechanism, so that automatic matching of the first position-limiting mechanism and the second position-limiting mechanism is achieved, manual operation is avoided, and manpower can be saved.

In some embodiments, the positioning apparatus further includes a sensor, and the sensor is fixed to the base and used for detecting the position of the bearing member. The sensor is connected with a peripheral device, and therefore the peripheral device can place the energy storage cabinet on the bearing member according to the position, detected by the sensor, of the bearing member.

In these embodiments, the sensor is connected with the peripheral device, so that the peripheral device places the energy storage cabinet on the bearing member according to the position, detected by the sensor, of the bearing member, automatic operation of the peripheral device can be achieved, manpower and material resources can be saved, and misoperation caused by manual errors can be avoided.

In some embodiments, the rotating member includes universal balls arranged on the base at intervals. The rotating member in these embodiments can be universal balls; a specific structural form of the rotating member is provided; and the universal balls are simple in installation mode and low in cost.

In a second aspect, the present application further provides a positioning system, including the positioning apparatus according to any one of the above embodiments, and the peripheral device. The peripheral device is used for placing the energy storage cabinet on the bearing member.

According to the technical solutions of the embodiments of the present application, the positioning system includes the positioning apparatus according to any one of the above embodiments. Therefore, according to these embodiments, the positioning apparatus can bear the energy storage cabinet in the production process of an energy storage production line of batteries, which can avoid the problems of tedious transportation, heavy installation, high labor intensity, low control accuracy and low production efficiency caused by manually placing the energy storage cabinet, and the production efficiency of the energy storage production line of batteries can be improved.

Beneficial Effects

According to the technical solutions of the embodiments of the present application, the positioning apparatus can bear the energy storage cabinet in the production process of an energy storage production line of batteries, which can avoid the problems of tedious transportation, heavy installation, high labor intensity, low control accuracy and low production efficiency caused by manually placing the energy storage cabinet, and the production efficiency of the energy storage production line of batteries can be improved.

DESCRIPTION OF THE DRAWINGS

By reading the detailed description of the implementations below, various other advantages and benefits will become apparent to those of ordinary skill in the art. The drawings are for the purpose of illustrating some implementations only and are not to be considered a limitation to the present application. Moreover, in all of the drawings, the same components are indicated by the same reference numerals. In the accompanying drawings.

Figure 1:
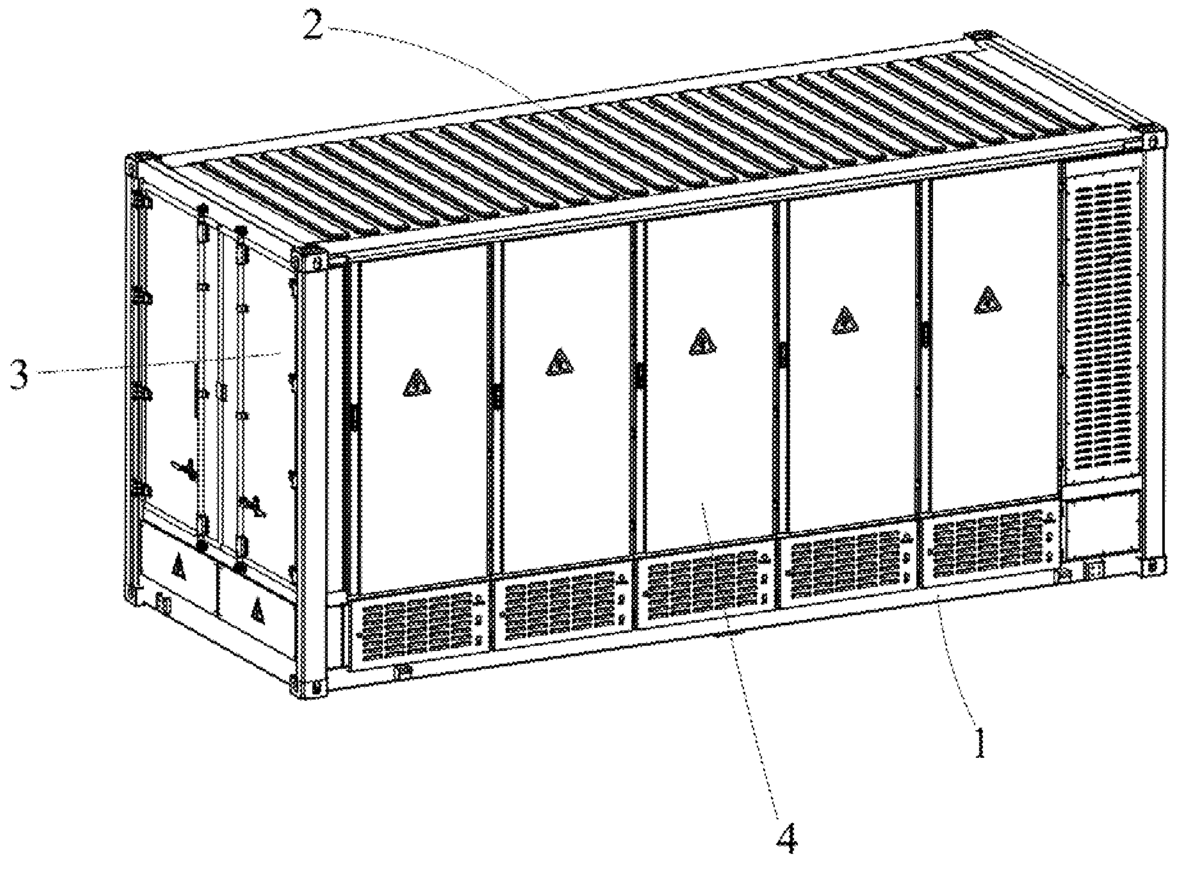
FIG. 1 is a structure schematic diagram of an energy storage cabinet according to some embodiments of the present application.

The attached marks and numbers in the specific embodiments are as follows:

1—cabinet body; 2—metal frame; 3—metal panel; 4—cabinet door; 5—base; 51—sliding rails; 6—bearing member; 61—first side; 62—second side; 63—third side; 64—fourth side; 7—first driving mechanism; 71—lead screw; 72—first pushing member; 73—fixing block; 8—second driving mechanism; 81—third pushing mechanism; 82—second driving member; 9—clamping mechanism; 91—support; 92—clamping plate; 93—second pushing member; and 921—notch.

DETAILED DESCRIPTION

Embodiments in technical solutions of the present application will be described in detail below in conjunction with the accompanying drawings. The following embodiments are only used to more clearly illustrate the technical solution of the present application, and therefore are only used as examples and cannot be used to limit the scope of protection of the present application.

Unless otherwise defined, all technical and scientific terms used herein have the same meanings as generally understood by those skilled in the art of the present application; the terms used herein are intended only to describe specific embodiments and are not intended to limit the present application; and the terms "including" and "having" and any variations thereof in the description and claims of the present application and in the foregoing description of the accompanying drawings and in the description thereof, and any variations thereof, are intended to cover non-exclusive inclusions.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiment of the present application, the meaning of "a plurality of" is more than two, unless otherwise expressly and specifically qualified.

A reference to "embodiment" herein means that a particular feature, mechanism, or characteristic described in conjunction with an embodiment may be included in at least one embodiment of the present application. The occurrence of the phrase in various places in the description does not necessarily refer to the same embodiment, nor is it an independent or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may represent three situations: A exists alone, both A and B exist, and B exists alone. In addition, the character "/" in this article generally indicates that the relationship between the preceding and following objects is an "or".

In the description of the embodiment of the present application, the term "a plurality of" refers to more than two (including two), similarly, "a plurality of groups" refers to two or more groups (including two groups), and "a plurality of members" refers to more than two members (including two members).

In the description of the embodiments of the present application, the technical terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like which indicate the orientation or positional relationship are based on the orientation or positional relationship shown in the accompanying drawing, and are only for the convenience of describing the embodiments of the present application and simplifying the description, and do not indicate or imply that the device or element referred to must have a specific orientation, be constructed and operated in a specific orientation, and therefore cannot be construed as a restriction on the embodiments of the present application.

In the description of the embodiments of the present application, unless otherwise expressly specified or limited, the technical terms "mounted", "linked", "connected", "fixed" and other terms shall be understood broadly, for example, they may be fixed, detachable, or integral, or mechanically or electrically connected, or directly linked, or indirectly linked through an intermediate medium, and may be communicated internally or interacted between two elements. For those of ordinary skill in the art, the specific meanings of the above terms in the embodiments of the present application can be understood according to specific situations.

At present, from the perspective of the development of the market situation, power batteries are increasingly more widely used. Power batteries are not only used in energy storage power systems such as hydropower, thermal power, wind power and solar power stations, but also widely used in electric vehicles such as electric bicycles, electric motorcycles, and electric vehicles, as well as military equipment and aerospace and other fields. With the development of electric vehicles, as well as military equipment and aerospace, batteries have become the key to the sustainable development of the automotive industry. For e-mobility, as well as military equipment and aerospace, battery technology is an important factor in their development.

The inventor notes that in the production of an energy storage production line of batteries in a factory, the process is basically operated manually. For example, an energy storage cabinet is manually placed on the forklift, and transported to the corresponding location by the forklift, and then the energy storage production line production process is carried out through the energy storage cabinet. At present, this process still has the problems of low degree of automation and high manual manpower, which will also lead to low production efficiency.

In order to solve the above problems, the applicant found an electric centering positioning mechanism including a centering positioning base plate, a centering positioning substrate and a working platform; a lifting cylinder is fixed to the centering positioning baseplate; the centering positioning substrate is arranged above the lifting cylinder; a working platform cover is arranged on the centering positioning substrate; two pairs of X-guide rails, two pairs of Y-guide rails, X-direction motors, Y-direction motors, X-direction synchronous belts, Y-direction synchronous belts, a X-direction centering module and a Y-direction centering module are arranged on the centering positioning substrate; one X-direction motor is mounted between each pair of X-guide rails; one Y-direction motor is mounted between each pair of Y-guide rails; the X-direction synchronous belts are mounted on the X-direction motor; the Y-direction synchronous belts are mounted on the Y-direction motors; the X-direction centering module is mounted on the X-direction synchronous belts; the Y-direction centering module is located on the Y-direction synchronous belts; this mechanism centers the product to position, and the accuracy can reach ±0.025 mm; the precision is high; and the method is simple. But this electric centering positioning mechanism has the following technical problems: the energy storage cabinet cannot be positioned in the production of an energy storage production line of batteries.

In view of above, in order to solve the above problems, the applicant has designed a positioning apparatus and system by in-depth research; and the positioning apparatus may solve the problems in the related art that an energy storage cabinet is tedious in transportation, heavy in installation, low in control precision, low in working efficiency and the like in related technology.

The batteries according to the present application consist of either a battery module or a battery cell. The batteries may include a lithium-ion secondary battery, a lithium-ion primary battery, a lithium-sulfur battery, a sodium-lithium-ion battery, a sodium-ion battery or a magnesium-ion battery, etc., which are not limited in these embodiments of the present application. These types of batteries may be used in a variety of electrical apparatuses. The electrical apparatuses may be vehicles, mobile phones, portable devices, laptops, ships, spacecraft, electric toys and power tools, and so on. The vehicle may be a fuel vehicle, a gas vehicle, or a new energy vehicle. The new energy vehicle may be an all-electric vehicle, a hybrid electric vehicle, an extended-range electric vehicle, or the like. The spacecraft includes an airplane, a rocket, a space shuttle, a spaceship, and the like. The electric toy includes a fixed or mobile electric toy, such as a game console, an electric car toy, an electric ship toy, and an electric aircraft toy. The electric tool includes a metal cutting electric tool, a grinding electric tool, an assembly electric tool, and a railway electric tool, such as an electric drill, an electric grinder, an electric wrench, an electric a screwdriver, an electric hammer, an impact drill, a concrete vibrator, and an electric planer. These embodiments of the present application do not make special restrictions on the above-mentioned electrical apparatuses.

The energy storage cabinet will be further described below: as shown in FIG. 1, FIG. 1 is a structure schematic diagram of an energy storage cabinet according to some embodiments of the present application. As shown in FIG. 1, the energy storage cabinet includes a cabinet body 1, and the cabinet body 1 may be of a cuboid structure or a cube structure. The cabinet body 1 may be composed of a metal frame 2 and a metal panel 3. The metal frame 2 can be composed of a plurality of stand columns and cross beams connected between every two stand columns. A cabinet door 4 capable of being opened and closed is arranged in front of the cabinet body 1. A battery rack is arranged in the cabinet body 1, and a plurality of battery boxes are arranged on the battery rack. The battery boxes are energy storage units of the energy storage cabinet.

Figure 2:
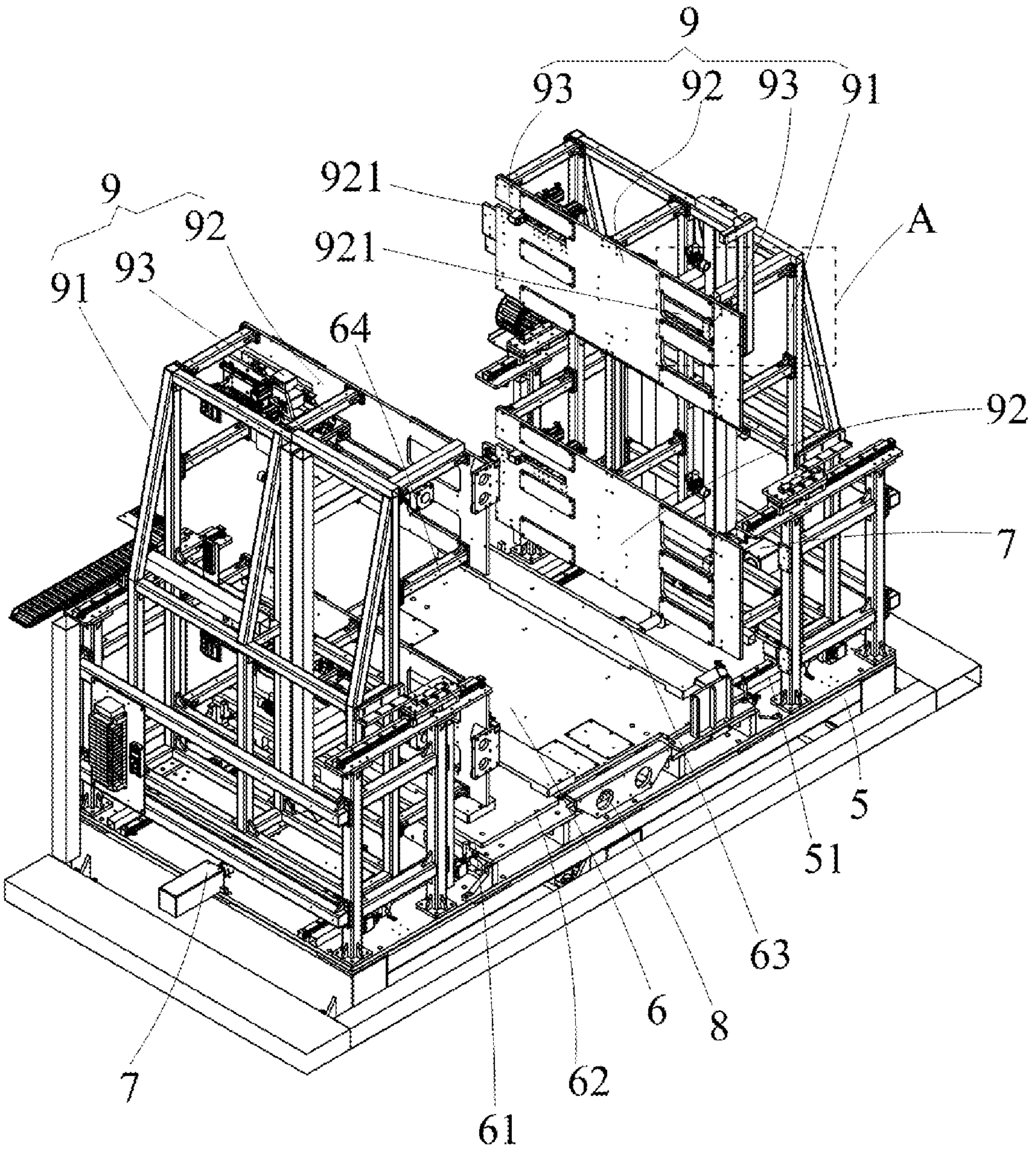
FIG. 2 is a structure schematic diagram of a positioning apparatus according to some embodiments of the present application.

According to some embodiments of the present application, the present application further provides a positioning apparatus; and as shown in FIG. 2, FIG. 2 is a structure schematic diagram of a positioning apparatus according to some embodiments of the present application.

As shown in FIG. 2, the positioning apparatus includes a base 5, a bearing member 6, a first driving mechanism 7 and a second driving mechanism 8. A rotating member is arranged on the base 5. The bearing member 6 is arranged on the base 5 through the rotating member. The first driving mechanism 7 is used for applying a force to the bearing member 6 from a first side 61 of the bearing member 6. The second driving mechanism 8 is used for applying a force to the bearing member 6 from a second side 62, adjacent to the first side 61, of the bearing member 6. When the bearing member 6 is subjected to force, a force is applied to the rotating member, and then the rotating member rotates in situ to drive the bearing member 6 to move; and when moving to a first preset position, the bearing member 6 is used for bearing an energy storage cabinet in the production process of an energy storage production line of batteries.

In these embodiments, the bearing member 6 may be a bearing plate used for bearing the energy storage cabinet. For example, in the production process of an energy storage production line of batteries, the force may be applied to the bearing member 6 from the first side 61 of the bearing member 6 through the first driving mechanism 7; the force is applied to the bearing member 6 from the second side 62, adjacent to the first side 61, of the bearing member 6 through the second driving mechanism 8, then the position of the bearing member 6 is adjusted, so that the bearing member 6 moves to a first preset position. In these embodiments, the first preset position is not limited, and in practical application, the first preset position may be set according to the size and shape of the bearing member 6, the size and shape of the base 5 and the size and shape of the energy storage cabinet. When the bearing member 6 moves to the first preset position, the energy storage cabinet is placed on the bearing member 6 through a peripheral device, and then the production process of an energy storage production line of batteries is carried out.

According to the technical solutions of the embodiments of the present application, the positioning apparatus can bear the energy storage cabinet in the production process of an energy storage production line of batteries, which can avoid the problems of tedious transportation, heavy installation, high labor intensity, low control accuracy and low production efficiency caused by manually placing the energy storage cabinet, and the production efficiency of the energy storage production line of batteries can be improved.

According to some embodiments of the present application, optionally, as shown in FIG. 2, two first driving mechanisms 7 are provided and are respectively arranged on the first side 61 and a third side 63, opposite to the first side 61 of the bearing member 6. The first driving mechanisms 7 are used for applying a force to the bearing member 6 from the first side 61 and the third side 63 respectively.

According to the technical solutions of these embodiments of the present application, two first driving mechanisms 7 are provided, so that the force can be applied to the bearing member 6 from the first side 61 and the third side 63, opposite to each other, of the bearing member 6 through the two first driving mechanisms 7, and the position of the bearing member 6 can be adjusted from the first side 61 and the third side 63, opposite to each other, of the bearing member 6.

Figure 3:
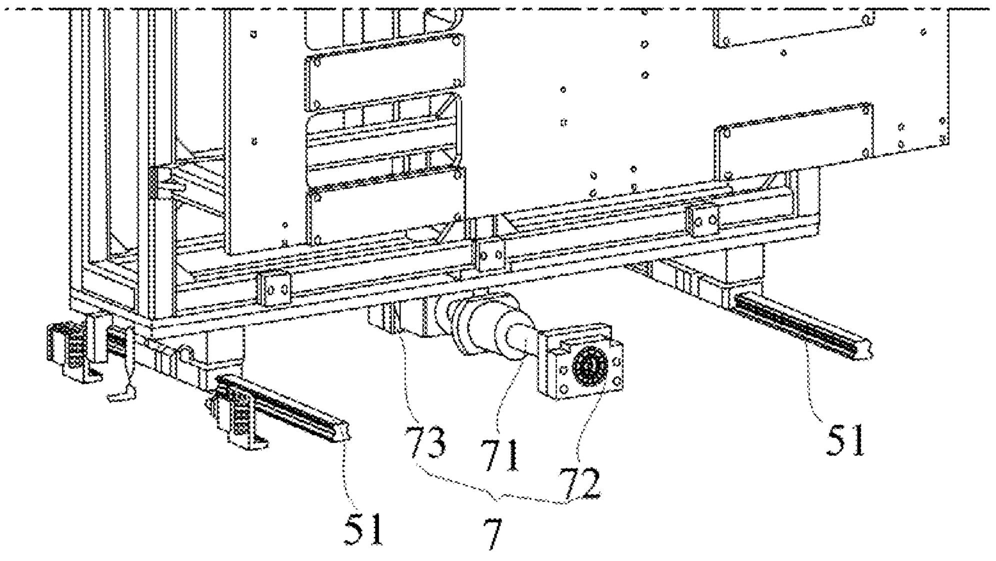
FIG. 3 is a structure schematic diagram of a first driving mechanism according to some embodiments of the present application.
Figure 4:
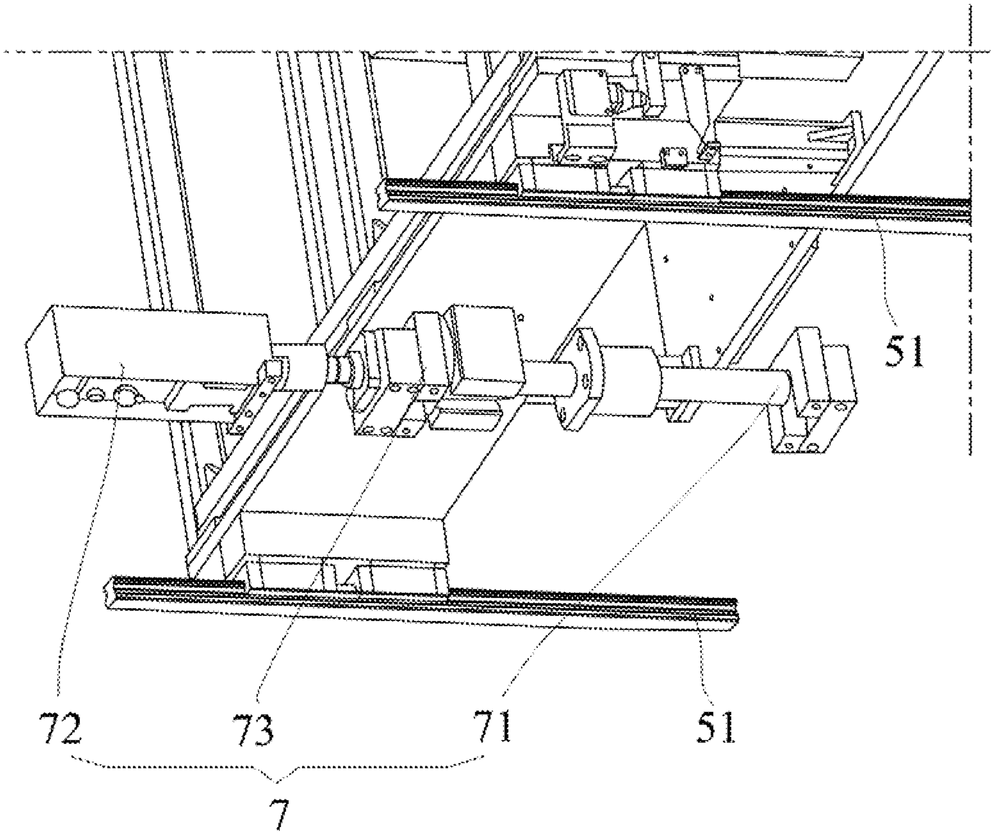
FIG. 4 is a structure schematic diagram of a first driving mechanism in another direction according to some embodiments of the present application.

According to some embodiments of the present application, optionally, as shown in FIG. 3 and FIG. 4, FIG. 3 is a structure schematic diagram of a first driving mechanism 7 according to some embodiments of the present application, and FIG. 4 is a structure schematic diagram of a first driving mechanism 7 in another direction according to some embodiments of the present application.

As shown in FIG. 3 and FIG. 4, each first driving mechanism 7 includes a first driving member, a lead screw 71 and a first pushing member 72. The driving member and the first pushing member 72 are connected to two ends of the lead screw 71 respectively, the first driving member is fixed to the base 5, and the first pushing member 72 is located between the bearing member 6 and the first driving member. The lead screw 71 is driven by the first driving member to rotate so as to drive the first pushing member 72 to move in the axis direction of the lead screw 71; and the first pushing member 72 pushes the bearing member 6 when moving. The first driving member according to these embodiments may be a motor. The motor rotates to drive the lead screw 71 to rotate. The first pushing member 72 may be a pushing slide block.

According to the technical solution of the embodiment of the present application, the first driving members drive the lead screws 71 to rotate, the lead screws 71 rotate to drive the first pushing members 72 to move in the axis direction of the lead screws 71, and the first pushing members 72 push the bearing member 6 when moving, so that the force can be applied to the bearing member 6 through the first pushing members 72, and the position of the bearing member 6 is adjusted.

Figure 5:
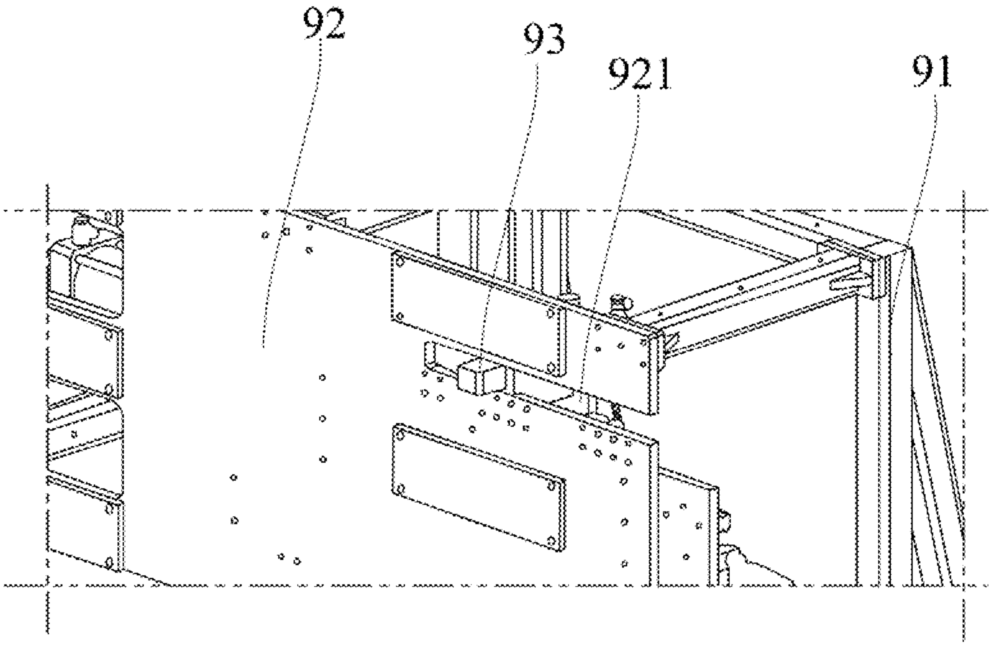
FIG. 5 is an amplification diagram of a mark A in FIG. 2.

According to some embodiments of the present application, optionally, as shown in FIG. 2 and FIG. 5, FIG. 5 is an amplification diagram of a mark A in FIG. 2. The positioning apparatus further includes a clamping mechanism 9. The clamping mechanism 9 includes: two supports 91 which are arranged on the first side 61 of the bearing member 6 and the third side 63 of the bearing member respectively, and the supports 91 are fixed to the lead screws 71. Two clamping plates 92 are fixed to the supports 91 respectively, arranged in the direction facing the bearing member 6 and used for clamping the energy storage cabinet borne by the bearing member 6. The lead screws rotate to drive the supports 91 to move in the axis direction of the lead screws 71, then the distance between the two supports 91 is increased or decreased, and therefore the two clamping plates clamp the energy storage cabinet.

It is to be noted that each clamping mechanism 9 may include one clamping plate 92, and each clamping mechanism 9 may also include two clamping plates 92, three clamping plates 92 or four clamping plates 92 and the like, which are not listed here. In practical application, the number of the clamping plates 92 may be set according to the size of the clamping plates 92 and the size of the energy storage cabinet.

As shown in FIG. 3 and FIG. 4, each first driving mechanism 7 further includes a fixing block 73 matched with the corresponding lead screw 71; the fixing blocks 73 are arranged on the lead screws 71 in a sleeving mode, and the clamping mechanisms 9 are fixed to the lead screws 71 through the fixing blocks 73. The lead screws 71 are driven by the first driving members to rotate so as to drive the fixing blocks 73 to move in the axis direction of the lead screws 71, and the fixing blocks 73 drive the clamping mechanisms 9 to move in the axis direction of the lead screws 71.

As shown in FIG. 3 and FIG. 4, the base 5 is provided with sliding rails 51. The clamping mechanisms 9 are arranged on the sliding rails 51 so that the clamping mechanisms 9 can move in the axis direction of the lead screws 71 along the sliding rails 51.

It is to be noted that there may be two sliding rails 51 which are evenly distributed on the two sides of the clamping mechanisms 9. By designing the two sliding rails 51, the clamping mechanisms 9 may be stressed more evenly when moving in the axis direction of the lead screws 71 along the sliding rails 51. In these embodiments, balls may be arranged in the sliding rails 51 so as to reduce the friction force between the clamping mechanisms 9 and the sliding rails 51. In these embodiments, the clamping mechanisms 9 move in the axis direction of the lead screws 71 along the sliding rails 51 so that the sliding rails 51 can limit the movement path of the clamping mechanisms 9.

According to the technical solution of the embodiment of the present application, the clamping mechanisms 9 are adopted to clamp the energy storage cabinet, so that in the production process of an energy storage production line of batteries, the energy storage cabinet can be clamped from two opposite sides of the energy storage cabinet through the clamping mechanisms 9, and relative displacement between the energy storage cabinet and the bearing member 6 is avoided. Because the distance between the two clamping plates 92 can be increased or decreased, the energy storage cabinets of different sizes can be adapted, and thus the positioning apparatus can have better compatibility.

According to some embodiments of the present application, optionally, as shown in FIG. 2 and FIG. 5, each clamping mechanism 9 further includes: at least two third driving mechanisms fixed to the supports 91; at least two second pushing members 93 which are respectively connected to the third driving mechanisms and arranged in the direction facing the bearing member 6, where the two third driving mechanisms are used for driving the two second pushing members 93 respectively to reciprocate in the direction of the second side 62, so that the two second pushing members 93 clamp the energy storage cabinet from two opposite sides of the energy storage cabinet; at least two fourth driving mechanisms which are fixed to the supports 91 and respectively connected to the second pushing members 93, where the two fourth driving mechanisms are used for driving the two second pushing members 93 respectively to reciprocate in the direction of the first side 61 of the bearing member 6, the second pushing members 93 apply a force to the energy storage cabinet when moving, and the energy storage cabinet apply a friction force to the bearing member 6 so as to push the energy storage cabinet to a second preset position.

For example, the clamping plates 92 may have notches 921, and the notches 921 are used as a motion track when the second thrusting members 93 reciprocate along the direction of the first side 61 under the drive of the fourth driving mechanisms. When the second pushing members 93 reciprocate along the direction of the second side 62 under the drive of the third driving mechanism, the second pushing members can pass through the notches 921.

It is to be that each clamping mechanism 9 can include two second pushing members 93, and each clamping mechanism 9 can also include four second pushing members 93, six second pushing members 93 or eight second pushing members 93 and the like, which is not listed here. In practical application, the number of the second pushing members 93 can be set according to the sizes of the second pushing members 93 and the size of the energy storage cabinet, so that the second pushing members 93 can clamp and push the energy storage cabinet to move. The second pushing members 93 in these embodiments can be pushing sliding blocks.

The third driving mechanisms include first air cylinders fixed to the second pushing members 93. The second pushing members 93 are driven by the first air cylinders to reciprocate in the direction of the second side 62 of the bearing member 6, and therefore the two second pushing members 93 can clamp the energy storage cabinet from two opposite sides of the energy storage cabinet.

The fourth driving mechanisms include second air cylinders fixed to the second pushing members 93. The second pushing members 93 are driven by the second air cylinders to reciprocate in the direction of first side 61 of the bearing member 6, and therefore the two second pushing members 93 can apply the force to the energy storage cabinet while clamping the energy storage cabinet. The energy storage cabinet applies the friction force to the bearing member 6, and the energy storage cabinet is pushed to a second preset position through the rotating member.

According to the technical solution of the embodiment of the present application, the force may be applied to the energy storage cabinet placed on the bearing member 6 so that the energy storage cabinet can be adjusted to the second preset position, and therefore it can be guaranteed that when the energy storage cabinet is not accurately located at the second preset position, the position of the energy storage cabinet can be finely adjusted, and thus the energy storage cabinet can be accurately located at the second preset position.

Figure 6:
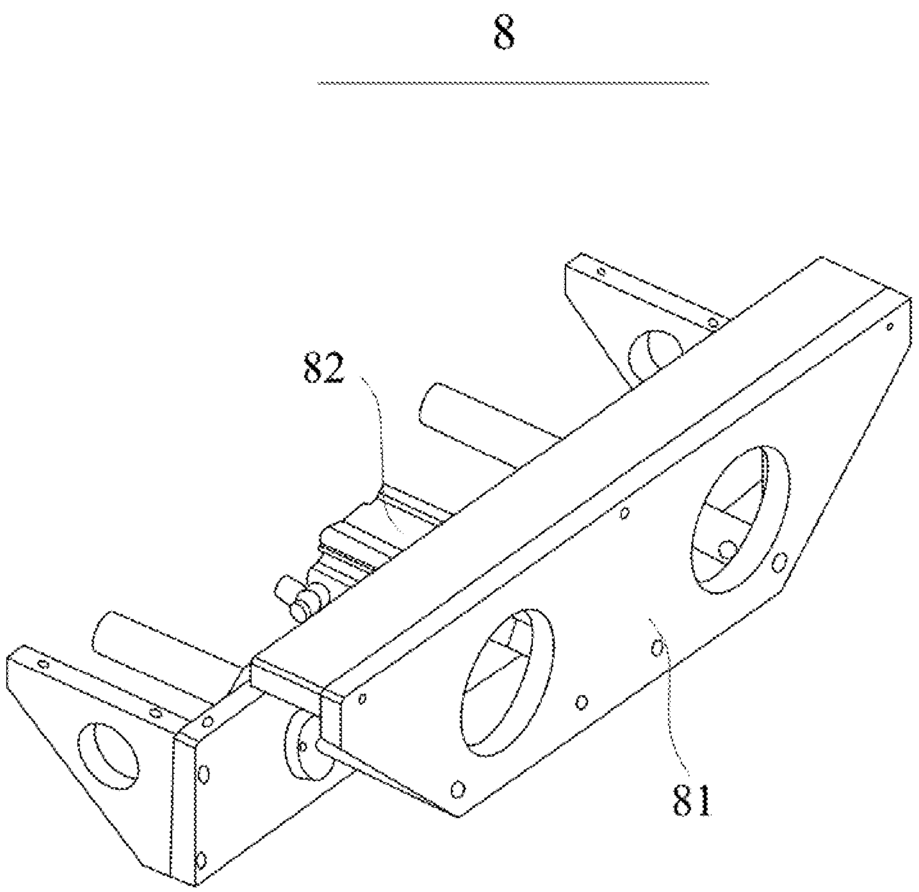
FIG. 6 is a structure schematic diagram of a second driving mechanism according to some embodiments of the present application.

According to some embodiments of the present application, optionally, as shown in FIG. 6, FIG. 6 is a structure schematic diagram of a second driving mechanism 8 according to some embodiments of the present application.

As shown in FIG. 6, the second driving mechanisms 8 include third pushing members 81 and second driving members 82. The third pushing members 81 are connected to the second driving members 82, the second driving members 82 are fixed to the base 5, the second driving members 82 are used for driving the third pushing members 81 to move, and the third pushing members 81 apply a force to the bearing member 6 when moving.

As shown in FIG. 2, there are two second driving mechanisms 8 which are arranged on the second side 62 and the fourth side 64, opposite to the second side 62, of the bearing member 6 respectively; and the second driving mechanisms 8 are used for applying the force to the bearing member 6 from the second side 62 and the fourth side 64 correspondingly. By arranging the two second driving mechanisms 8, the two second driving mechanisms 8 can apply the force to the bearing member 6 from the second side 62 and the fourth side 64, opposite to each other, of the bearing member 6, and therefore the position of the bearing member 6 can be adjusted from the second side 62 and the fourth side 64, opposite to each other, of the bearing member 6.

According to the technical solution of the embodiment of the present application, the second driving members 82 drive the third pushing members 81 to move, the third pushing members 81 apply the force to the bearing member 6 when moving, and therefore the position of the bearing member 6 can be adjusted in the manner that the second driving members 82 drive the third pushing members 81.

As shown in FIG. 6, the second driving members 82 are third air cylinders, and the third pushing members 81 are pushing plates. Through this design, a specific structural form of the second driving members 82 is provided, the universality of the solution can be improved, and the assembling manner of the third air cylinders and the third pushing members 81 is simpler and more convenient.

According to some embodiments of the present application, optionally, the bearing member 6 is provided with a first position-limiting mechanism, and the base 5 is provided with a second position-limiting mechanism. When the bearing member 6 moves to a third preset position, the bearing member 6 is limited on the base 5 through cooperation of the first position-limiting mechanism and the second position-limiting mechanism, so that relative displacement between the bearing member 6 and the base 5 is avoided.

For example, the first position-limiting mechanism can be a positioning hole, and the second position-limiting mechanism can be a positioning pin. Or, in another embodiment, the first position-limiting mechanism can be a positioning pin, and the second position-limiting mechanism can be a positioning hole.

According to the technical solution of the embodiment of the present application, a specific fixing mode for detachably fixing the bearing member 6 and the base 5 together is provided through this design, so the connecting strength of the bearing member 6 and the base 5 can be improved, and relative displacement between the bearing member 6 and the base 5 is avoided.

According to some embodiments of the present application, optionally, the positioning apparatus further includes a fifth driving mechanism. The fifth driving mechanism is connected to the second position-limiting mechanism and used for driving the second position-limiting mechanism to move to the first position-limiting mechanism to cooperate with the first position-limiting mechanism when the bearing member 6 moves to the third preset position.

In these embodiments, the fifth driving mechanism may include a fourth air cylinder connected to the second position-limiting mechanism. The second position-limiting mechanism is driven by the fourth air cylinder to move, so that a specific structural form for driving the second position-limiting mechanism to move is provided, and the feasibility of this solution can be improved.

As shown in FIG. 2, the positioning apparatus further includes a floating plate. The floating plate is arranged on the bearing member 6 and used for bearing the energy storage cabinet, and the height of the energy storage cabinet can be increased through the floating plate. An elastic member can be arranged on the face, making contact with the energy storage cabinet, of the floating plate, and the energy storage cabinet makes elastic contact with the floating plate. It is to be noted that the number of the floating plates in the embodiment may be set to be 3 but not limited to be 3, and the number of the floating plates may be designed according to the size and weight of the energy storage cabinet in practical application.

According to the technical solution of the embodiment of the present application, the fifth driving mechanism drives the second position-limiting mechanism to move to the first position-limiting mechanism to cooperate with the first position-limiting mechanism, thus automatic matching of the first position-limiting mechanism and the second position-limiting mechanism can be achieved, manual operation is avoided, and manpower can be saved.

According to some embodiments of the present application, optionally, as shown in FIG. 2, the positioning apparatus further includes a sensor, and the sensor is fixed to the base 5 and used for detecting the position of the bearing member 6. The sensor is connected with a peripheral device, and therefore the peripheral device can place the energy storage cabinet on the bearing member 6 according to the position, detected by the sensor, of the bearing member 6.

According to the technical solution of the embodiment of the present application, the sensor is connected with the peripheral device, the peripheral device can place the energy storage cabinet on the bearing member 6 according to the position, detected by the sensor, of the bearing member 6, thus automatic operation of the peripheral device can be achieved, manpower and material resources can be saved, and misoperation caused by manual errors can be avoided.

According to some embodiments of the present application, optionally, as shown in FIG. 2, the rotating member includes universal balls arranged on the base 5 at intervals.

According to the technical solution of the embodiment of the present application, the rotating member in these embodiments may be the universal balls, a specific structural form of the rotating member is provided, and the universal balls are simple in mounting mode and low in cost.

According to some embodiments of the present application, the present application further provides a positioning apparatus. As shown in FIG. 2, the positioning apparatus device includes: a rotating member arranged on a base 5. The bearing member 6 is arranged on the base 5 through the rotating member. The first driving mechanism 7 is used for applying a force to the bearing member 6 from a first side 61 of the bearing member 6. The second driving mechanism 8 is used for applying a force to the bearing member 6 from a second side 62, adjacent to the first side 61, of the bearing member 6. When the bearing member 6 is subjected to force, a force is applied to the rotating member, and then the rotating member rotates in situ to drive the bearing member 6 to move; and when moving to a first preset position, the bearing member 6 is used for bearing an energy storage cabinet in the production process of an energy storage production line of batteries. The rotating member includes universal balls arranged on the base 5 at intervals.

In these embodiments, the bearing member 6 may be a bearing plate used for bearing the energy storage cabinet. For example, in the production process of an energy storage production line of batteries, the force may be applied to the bearing member 6 from the first side 61 of the bearing member 6 through the first driving mechanism 7; the force is applied to the bearing member 6 from the second side 62, adjacent to the first side 61, of the bearing member 6 through the second driving mechanism 8, then the position of the bearing member 6 is adjusted, so that the bearing member 6 moves to a first preset position. In these embodiments, the first preset position is not limited, and in practical application, the first preset position may be set according to the size and shape of the bearing member 6, the size and shape of the base 5 and the size and shape of the energy storage cabinet. When the bearing member 6 moves to the first preset position, the energy storage cabinet is placed on the bearing member 6 through a peripheral device, and then the production process of an energy storage production line of batteries is carried out.

Two first driving mechanisms 7 are provided and are respectively arranged on the first side 61 and a third side 63, opposite to the first side 61 of the bearing member 6. The first driving mechanisms 7 are used for applying a force to the bearing member 6 from the first side 61 and the third side 63 respectively.

The positioning apparatus further includes two clamping mechanisms 9. The two clamping mechanisms 9 are respectively arranged on the first side 61 and the third side 63. The clamping mechanisms 9 are fixed to the first driving mechanisms 7. The first driving mechanisms 7 drive the clamping mechanisms 9 to move, then the distance between the two clamping mechanisms 9 is increased or decreased, and therefore the energy storage cabinet can be clamped.

Each clamping mechanism 9 further includes: at least two third driving mechanisms fixed to the supports 91; at least two second pushing members 93 which are respectively connected to the third driving mechanisms and arranged in the direction facing the bearing member 6, where the two third driving mechanisms are used for driving the two second pushing members 93 respectively to reciprocate in the direction of the second side 62, so that the two second pushing members 93 clamp the energy storage cabinet from two opposite sides of the energy storage cabinet; at least two fourth driving mechanisms which are fixed to the supports 91 and respectively connected to the second pushing members 93, where the two fourth driving mechanisms are used for driving the two second pushing members 93 respectively to reciprocate in the direction of the first side 61 of the bearing member 6, the second pushing members 93 apply a force to the energy storage cabinet when moving, and the energy storage cabinet apply a friction force to the bearing member 6 so as to push the energy storage cabinet to a second preset position.

The positioning apparatus further includes a sensor, and the sensor is fixed to the base 5 and used for detecting the position of the bearing member 6. The sensor is connected with a peripheral device, and therefore the peripheral device can place the energy storage cabinet on the bearing member 6 according to the position, detected by the sensor, of the bearing member 6.

According to these embodiments, the positioning apparatus can bear the energy storage cabinet in the production process of an energy storage production line of batteries, which can avoid the problems of tedious transportation, heavy installation, high labor intensity, low control accuracy and low production efficiency caused by manually placing the energy storage cabinet, and the production efficiency of the energy storage production line of batteries can be improved.

According to some embodiments of the present application, the present application further provides a positioning system. The positioning system in these embodiments includes the positioning apparatus according to any one of the above embodiments, and the peripheral device. The peripheral device is used for placing the energy storage cabinet on the bearing member.

According to the technical solutions of the embodiments of the present application, the positioning system includes the positioning apparatus according to any one of the above embodiments. Therefore, according to these embodiments, the positioning apparatus can bear the energy storage cabinet in the production process of an energy storage production line of batteries, which can avoid the problems of tedious transportation, heavy installation, high labor intensity, low control accuracy and low production efficiency caused by manually placing the energy storage cabinet, and the production efficiency of the energy storage production line of batteries can be improved.

Finally, it is to be noted that the above embodiments are only used for illustrating the technical solutions of the present application, not to limit them, and although the present application is described in detail with reference to the foregoing embodiments, those of ordinary skill in the art should understand that it may still modify the technical solutions described in the foregoing embodiments, or replace some or all of the technical features therein, and these modifications or substitutions do not make the essence of the corresponding technical solutions out of the scope of the technical solutions of the embodiments of the present application, and they should be covered by the scope of the claims and description of the present application. In particular, the technical features mentioned in the various embodiments can be combined in any manner as long as there is no structural conflict. The present application is not limited to the specific embodiments disclosed herein, but includes all technical solutions that fall within the scope of the claims.

What is claimed is:

1. A positioning apparatus, comprising:

a base on which a rotating member is arranged;

a bearing member arranged on the base through the rotating member;

two first driving mechanisms respectively arranged on a first side and a third side, opposite to the first side, of the bearing member, and configured to apply a force to the bearing member from the first side and the third side respectively; and a second driving mechanism configured to apply a force to the bearing member from a second side, adjacent to the first side, of the bearing member;

wherein when the bearing member is subjected to force, a force is applied to the rotating member, the rotating member rotates in situ to drive the bearing member to move, and the bearing member is configured to, when moving to a first preset position, bear an energy storage cabinet in the production process of an energy storage production line of batteries.

2. The positioning apparatus according to claim 1, wherein:

each of the first driving mechanisms comprises a first driving member, a lead screw, and a first pushing member;

the first driving member and the first pushing member are connected to two ends of the lead screw respectively, the first driving member is fixed to the base, and the first pushing member is located between the bearing member and the first driving member;

the lead screw is driven by the first driving member to rotate so as to drive the first pushing member to move in the axis direction of the lead screw; and the first pushing member pushes the bearing member when moving.

3. The positioning apparatus according to claim 2, further comprising:

a clamping mechanism, wherein the clamping mechanism comprises:

two supports which are arranged on the first side and the third side respectively, the supports being fixed to the lead screws; and two clamping plates which are fixed to the supports respectively, arranged in the direction facing the bearing member, and configured to clamp the energy storage cabinet borne by the bearing member;

wherein the lead screws rotate to drive the supports to move in the axis direction of the lead screws, to increase or decrease the distance between the two supports, and therefore the two clamping plates clamp the energy storage cabinet.

4. The positioning apparatus according to claim 3, wherein the clamping mechanism further comprises:

at least two third driving mechanisms fixed to the supports;

at least two second pushing members which are respectively connected to the third driving mechanisms and arranged in the direction facing the bearing member, the two third driving mechanisms being configured to drive the two second pushing members respectively to reciprocate in the direction of the second side, so that the two second pushing members clamp the energy storage cabinet from two opposite sides of the energy storage cabinet; and at least two fourth driving mechanisms which are fixed to the supports and respectively connected to the second pushing members, the two fourth driving mechanisms being configured to drive the two second pushing members respectively to reciprocate in the direction of the first side, the second pushing members applying a force to the energy storage cabinet when moving, and the energy storage cabinet applying a friction force to the bearing member so as to push the energy storage cabinet to a second preset position.

5. The positioning apparatus according to claim 1, wherein:

the second driving mechanism comprises a third pushing member and a second driving member;

the third pushing member is connected to the second driving member;

the second driving member is fixed to the base;

the second driving member is configured to drive the third pushing member to move; and the third pushing member applies a force to the bearing member when moving.

6. The positioning apparatus according to claim 1, wherein:

the bearing member is provided with a first position-limiting mechanism, and the base is provided with a second position-limiting mechanism; and when the bearing member moves to a third preset position, the bearing member is limited on the base through the cooperation of the first position-limiting mechanism and the second position-limiting mechanism, and therefore relative displacement between the bearing member and the base is avoided.

7. The positioning apparatus according to claim 6, further comprising:

a fifth driving mechanism which is connected to the second position-limiting mechanism and configured to drive the second position-limiting mechanism to move to the first position-limiting mechanism to cooperate with the first position-limiting mechanism when the bearing member moves to the third preset position.

8. The positioning apparatus according to claim 1, further comprising:

a sensor which is fixed to the base and configured to detect the position of the bearing member;

wherein the sensor is connected with a peripheral device, to enable the peripheral device to place the energy storage cabinet on the bearing member according to the position, detected by the sensor, of the bearing member.

9. The positioning apparatus according to claim 1, wherein the rotating member comprises universal balls arranged on the base at intervals.

10. A positioning system, comprising:

a positioning apparatus including:

a base on which a rotating member is arranged;

a bearing member arranged on the base through the rotating member;

two first driving mechanisms respectively arranged on a first side and a third side, opposite to the first side, of the bearing member, and configured to apply a force to the bearing member from the first side and the third side respectively; and a second driving mechanism configured to apply a force to the bearing member from a second side, adjacent to the first side, of the bearing member;

wherein when the bearing member is subjected to force, a force is applied to the rotating member, the rotating member rotates in situ to drive the bearing member to move, and the bearing member is configured to, when moving to a first preset position, bear an energy storage cabinet in the production process of an energy storage production line of batteries; and a peripheral device configured to place the energy storage cabinet on the bearing member.

* * * * *